United States Patent [19]
Chadwick et al.

[11] Patent Number: 6,112,223
[45] Date of Patent: Aug. 29, 2000

[54] APPARATUS FOR FAULT-TOLERANT MULTIMEDIA PROGRAM DISTRIBUTION

[75] Inventors: Henry Dexter Chadwick, Herndon, Va.; David William Davenport, Raleigh, N.C.; Leonard DeGollado, Silver Spring, Md.; James William Eldridge, San Jose, Calif.; Michael Joseph Flynn, Palo Alto, Calif.; Roger Lee Haskin, San Jose, Calif.; Leung Ping Lee, Potomac, Md.; Gregory Allen Poist, Union City, Calif.; Frank Lonnie Stein, Vienna, Va.; Jeffrey Lloyd Weiner, Austin, Tex.

[73] Assignee: International Business Machines Corporation, Armonk, N.Y.

[21] Appl. No.: 08/859,550

[22] Filed: May 20, 1997

Related U.S. Application Data

[63] Continuation of application No. 08/428,980, Apr. 26, 1995, abandoned.

[51] Int. Cl.$^7$ ........................................................ G06F 9/00
[52] U.S. Cl. ............................................ 709/201; 709/102
[58] Field of Search ...................................... 709/100, 102, 709/103, 104, 105, 201, 202, 203, 204

[56] References Cited

U.S. PATENT DOCUMENTS

| 4,577,272 | 3/1986 | Ballew et al. ........................... 364/200 |
|---|---|---|
| 4,590,551 | 5/1986 | Mathews .................................. 364/200 |
| 4,653,112 | 3/1987 | Ouimette .................................... 382/69 |
| 4,704,725 | 11/1987 | Harvey et al. .............................. 380/9 |
| 4,947,244 | 8/1990 | Fenwick et al. . | |
| 4,999,771 | 3/1991 | Ralph et al. ............................ 364/200 |
| 5,119,188 | 6/1992 | McCalley et al. ........................ 358/86 |
| 5,168,353 | 12/1992 | Walker et al. . | |
| 5,283,638 | 2/1994 | Engberg et al. ........................... 348/14 |
| 5,392,223 | 2/1995 | Caci ......................................... 364/514 |
| 5,467,347 | 11/1995 | Petersen .................................. 370/60.1 |
| 5,544,161 | 8/1996 | Bigham et al. ......................... 370/58.1 |
| 5,600,844 | 2/1997 | Shaw et al. .............................. 395/800 |
| 5,603,058 | 2/1997 | Belknap et al. ......................... 395/855 |

FOREIGN PATENT DOCUMENTS

| 0551718 | 10/1992 | European Pat. Off. . | |
|---|---|---|---|
| 0649092 | 9/1994 | European Pat. Off. . | |
| 5544206 | 3/1980 | Japan ............................... H04N 7/02 |
| 6324022 | 10/1988 | Japan ............................... H04B 1/74 |
| 4115764 | 4/1992 | Japan ............................... H04N 7/00 |

OTHER PUBLICATIONS

"Single Server Queuing System with Time and Information Redundancy," Cibern., Syse. Anal., vol. 27, No. 5,0 pp. 774–785, Sep./Oct. 1991.

*IBM Technical Disclosure Bulletin*, "Multiple CPU Support for a Virtual–Machine Operating System," Jun. 1988, pp. 423–428.

IEEE Communications Magazine, May 1994, vol. 32, No. 5, pp. 82–88.

"Dynamic Parity Stripe reorganizations for Raid5 disk arrays" Parallel and Distributed Information Systems, 1994 Int'l Conference.

"ParaServe: A parallel mass storage Server" Tencon '94–1994 IEEE Region 10 Conf.

*Primary Examiner*—Majid Banankhah
*Attorney, Agent, or Firm*—Stephen T. Keohane

[57] ABSTRACT

A fault tolerant multimedia program distribution system includes a number of controllers for transmitting instances of predetermined multimedia program information to a communications network at predetermined times, a storage system for storing the multimedia program information, and a multiple access storage control device which allows multiple access to the storage system by more than one distribution controller at any time.

13 Claims, 4 Drawing Sheets

APPARATUS FOR FAULT-TOLERANT MULTIMEDIA PROGRAM DISTRIBUTION

This application is a continuation of application Ser. No. 08/428,980, filed on Apr. 26, 1995, which was abandoned upon the filing hereof.

BACKGROUND OF THE INVENTION

1. Field of the Invention

The present invention is related to information handling systems, and more particularly, to information handling systems for broadcasting data, including video and audio information on a communications network to one or more end users.

2. Prior Art

When multimedia servers broadcast video and audio information simultaneously to many recipients, a failure in the multimedia server will disrupt those recipients. A backup server could be provided, but that is an expensive solution and may result in a lengthy delay while bringing the backup server on line.

One class of multimedia server is that which is a repository for video and audio information related to popular movies. A user would request that a movie be sent over a communications facility by one of a number of methods well known in the prior art. For the purposes of this discussion, assume that the data representing the video and audio information of the movie is being transmitted in real time. There might be two methods of presenting the data. First is on demand, where a user would request a movie and that movie would be started and transmitted to just that user. This method could be used for lightly requested movies, but would be impractical for movie having a heavy demand. For such movies having a heavy demand, a second method would be used in which a new copy of the movie would be started periodically (i.e., every 5 minutes, regardless of the demand). Users requesting that movie within any 5 minute period would share the same transmission of the next copy started in a multiplexed fashion.

U.S. Pat. No. 4,947,244 teaches a video selection and distribution system of a well-known prior art type in which a number of video cassette players are loaded with various program sources such as movies and the selection and distribution system allows a user, for example a hotel guest, to select a movie from the hotel room for viewing at a time convenient to the hotel guest. The patent distinguishes from systems in which programs are broadcast on a predetermined schedule.

Although the patent generally relates to selection and distribution of video and audio program information, the patent does not teach the fault tolerant program distribution system as claimed herein.

U.S. Pat. No. 5,168,353 entitled "VIDEO DISTRIBUTION SYSTEM ALLOW VIEWER ACCESS TO TIME STAGGERED IDENTICAL PRERECORDED PROGRAMS", teaches a prior art video distribution system which employs a number of video players such as video cassette recorders or laser disc players to play movies or other program material into a distribution system in accordance with a predetermined schedule.

The patent does not address the fault-tolerant program distribution system as claimed herein.

The prior art discussed above clearly indicates a need for a fault tolerant multimedia distribution system which does not require redundant hardware and software.

SUMMARY OF THE INVENTION

Therefore, it is an object of the present invention to efficiently distribute multimedia program information in a fault tolerant system having multiple access to storage media containing such multimedia program information.

Accordingly, a fault tolerant multimedia program distribution system includes a number of controllers for transmitting instances of predetermined multimedia program information to a communications network at predetermined times, a storage system for storing the multimedia program information, and a multiple access storage control device which allows multiple access to the storage system by more than one distribution controller at any time.

It is a feature of the present invention that multimedia program information may be efficiently distributed in a fault-tolerant system which eliminates the need for redundant hardware and software.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
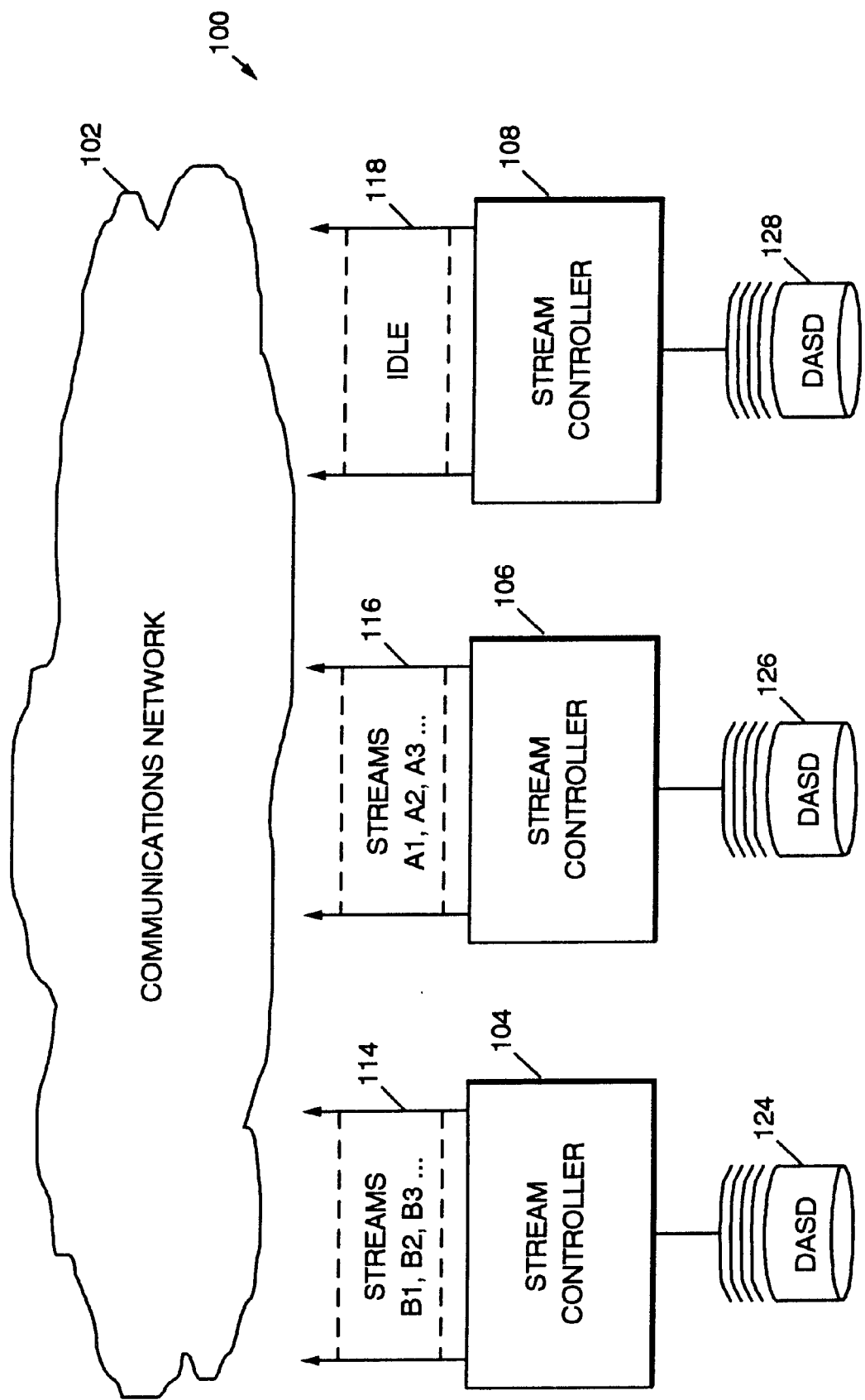
FIG. 1 is a block diagram of a prior art program distribution system.

Referring now to FIG. 1, a prior art program distribution system will be described.

A program distribution system 100 includes a communications network 102 to which are connected a number of users (not shown) and a number of program information servers such as stream controllers 104, 106 and 108. Each stream controller such as 104 provides program information, perhaps in the form of video and audio for movies or the like stored on DASDs 124, 126 or 128 for stream controllers 104 or 106 or 108 respectively to communications network 102 through streams 114, 116 or 118, respectively.

In the example shown in FIG. 1, only controllers 104 and 106 are active, wherein stream controller 106 is feeding streams A1, A2, A3, etc., and stream controller 104 is feeding streams B1, B2, B3, etc., wherein each of the streams A1, etc. and B1, etc., represents a different program or movie being transmitted to the communications network.

Note that stream controller 108 is idle and no information is being sent through streams 118 to communications network 102 from DASD 128.

If a failure occurs in stream controllers 104 or 106 or in streams 114 or 116, distribution of program information will be interrupted causing inconvenience to the end users and perhaps loss of revenue to the service provider. In such instance, stream controller 108 which represents a 50% redundancy for both the stream controller 108 and the DASD 128, are brought on-line and data must be transferred from the DASD supplying the failed stream such as DASD 124 to DASD 128 and the stream must be continued from the point of interruption which occurred when the failure occurred in the stream controller or stream, for example 104 or 114.

The system shown in FIG. 1 has several disadvantages. The first is that there is a cost in terms of an additional stream controller and DASD to sit idle until a failure occurs and which provides no distribution at other times. Another disadvantage is that each of the DASDs 124, 126, 128 only stores some portion of the program information to be distributed on communications network 102. This also results in time lost since data must be transferred from one DASD such as 124 to the idle DASD 128 in order for the data to be retransmitted on communications network 102 through stream controller 108 upon a failure of stream controller 104 for example.

The system embodying the present invention solves the problems identified above with reference to FIG. 1, as described below.

Figure 2:
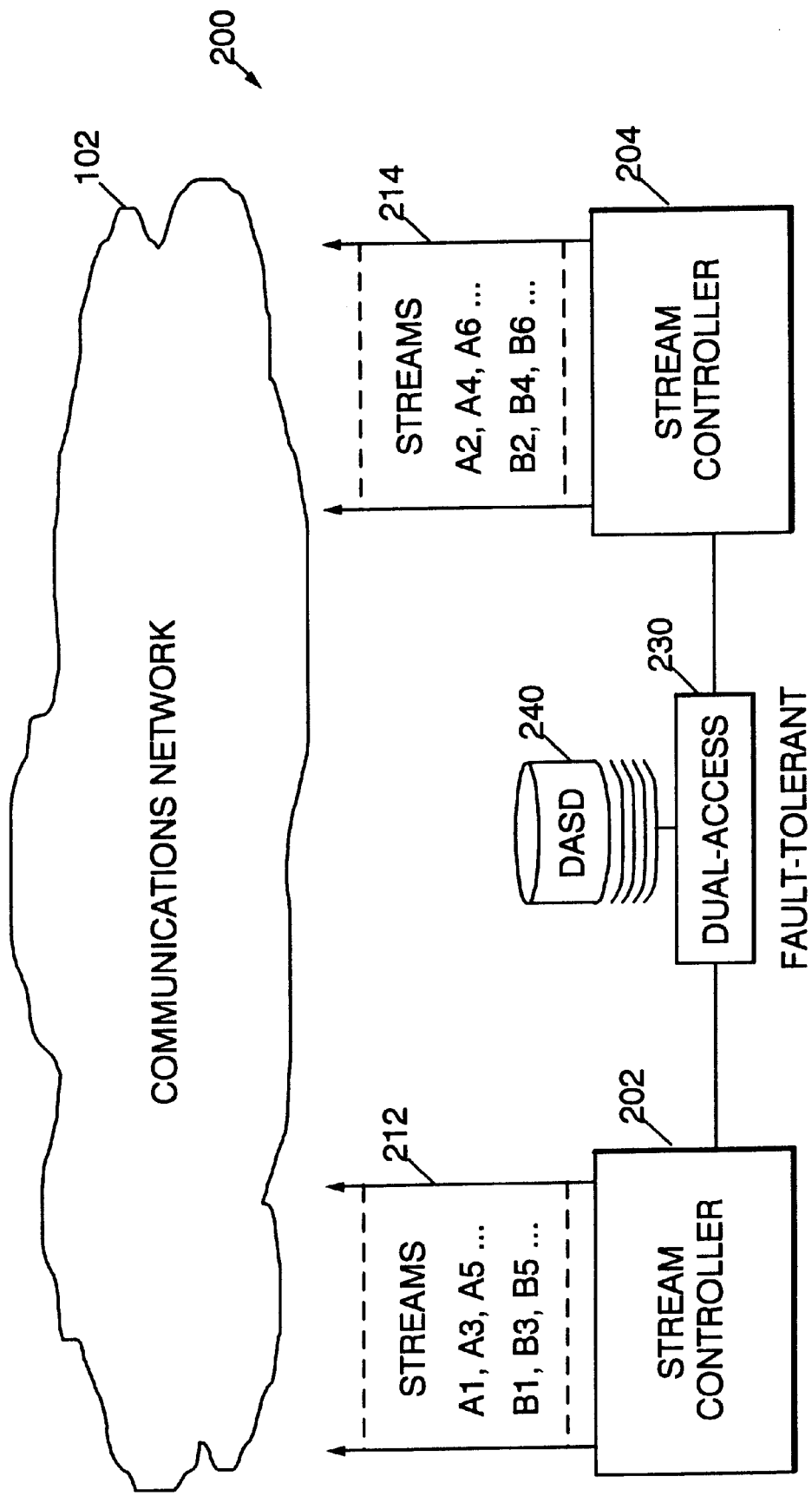
FIG. 2 is a block diagram of a multimedia program distribution system in accordance with the present invention.

Referring now to FIG. 2, a multimedia program distribution system in accordance with the present invention will be described. System 200 includes a communications network 102 which is the same as previously described having a group of end users (not shown) and a number of servers referred to as stream controllers 202 and 204 supplying streams of program information to the communications network through streams 212 from stream controller 202 and 214 from stream controller 204.

Stream controllers 202 and 204 are each connected to independent ports of dual access fault tolerant storage controller 230. Dual access storage controller 230 allows simultaneous access to storage system 240 by more than one requester at the same time.

Storage system 240 may advantageously be implemented as a redundant array of independent drives or RAID. RAID system 240 must have multiple read port capability to allow simultaneous access by more than one stream controller 202, 204 through dual access controller 230.

Dual access storage controller 230 and storage system 240 are devices which are well known in the art and may be implemented by any of several commercially available products.

Figure 3:
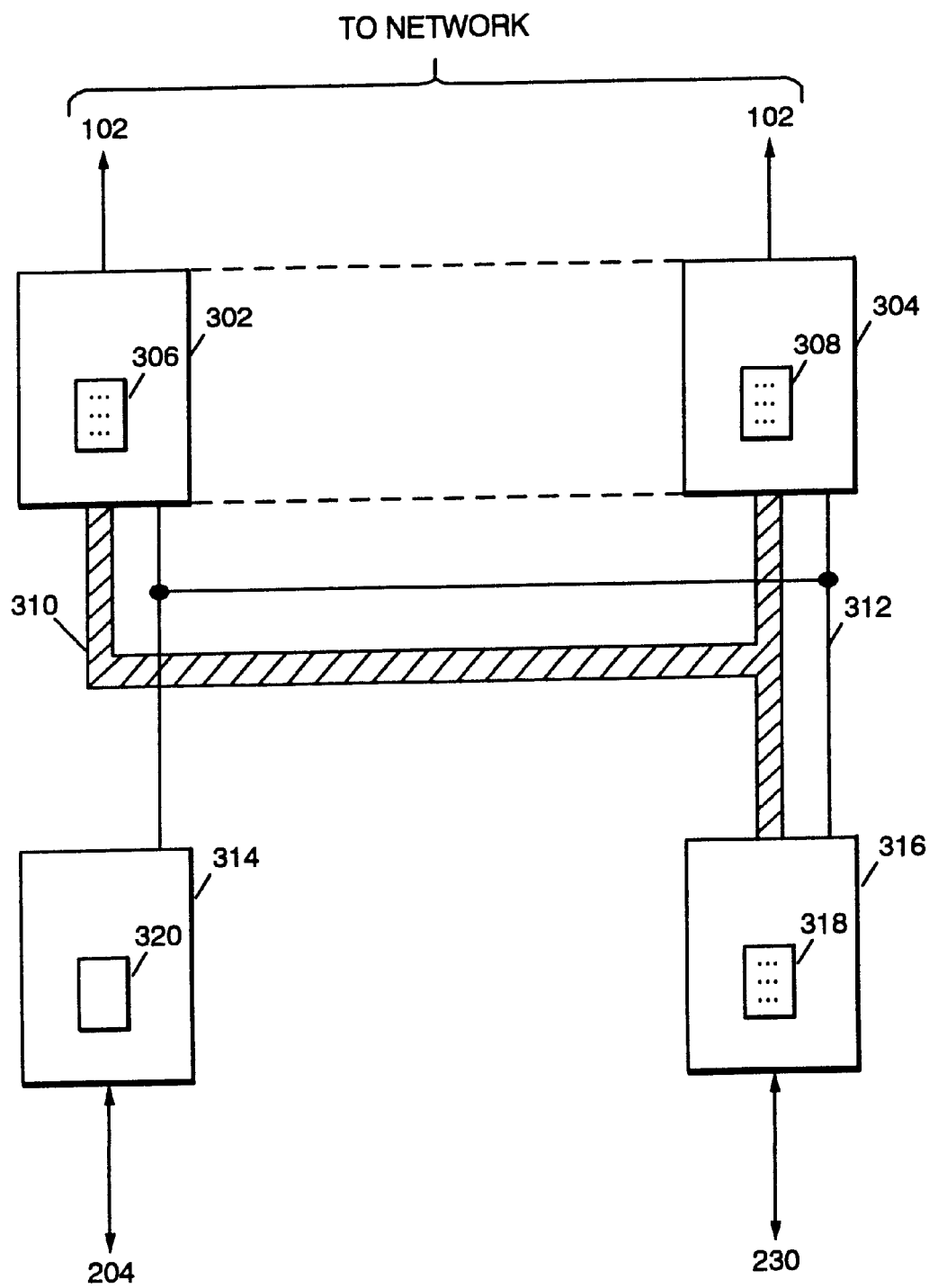
FIG. 3 is a block diagram of a video distribution controller in accordance with the present invention.

Referring now to FIG. 3, stream controller such as 202 or 204 for controlling the distribution of multimedia program information in accordance with the present invention will be described.

Stream controller 202 includes three types of processors. These are communications processor 302, 304, storage processor 316, and system control processor 314. Typically, each stream controller 202 includes one system control processor 314, many communications processors 302, 304 and one or more storage processors 316.

For ease of understanding, the preferred embodiment of the present invention will be described with respect to FIG. 3, which shows a single storage processor 316. Each processor is programmable and includes an associated memory 306, 308, 318, 320 and interface logic. System control processor 314 controls the operation of communications processors 302, 304 and storage processors 316. System control processor 314 also communicates with stream controller 204 and coordinates system functions between stream controllers 202 and 204.

Storage processor 316 controls storing to and retrieving of files from storage system 240. Under system control processor control, storage processor 316 reads a block of multimedia data from storage system 240 and transmit the data to one of the communications processors 302, 304. Each communications processor 302, 304 is programmed to connect to and communicate with the communications network 102. Communications processor 302, 304 manages connection to an end user, under control of system control processor 314. Communications processor 302, 304 then accepts blocks of data from storage system 240 and transmit the data over communications network 102 to the end user. Data and instructions are transmitted between units of stream controller 202 separately over 2 buses. Bus 310 transmits data and bus 312 transmits instructions.

The operation of the multimedia program information distribution system in accordance with the present invention will be further described with reference to FIG. 4A and 4B, which are flow charts of the operation of the system.

Figure 4B:
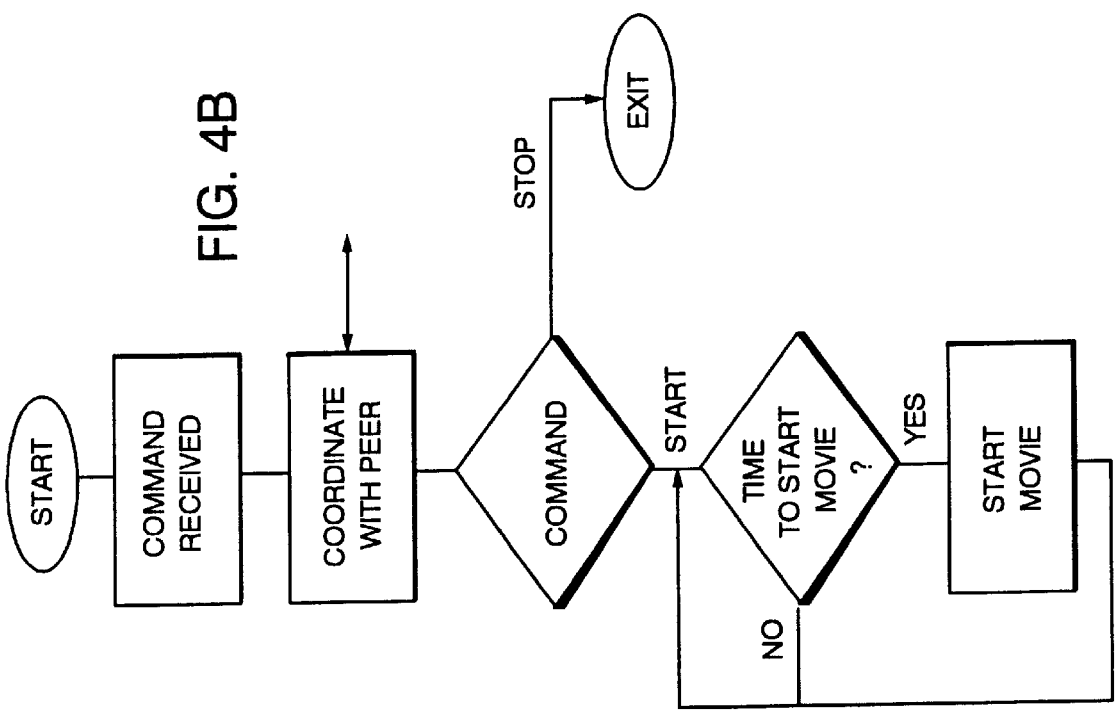
FIGS. 4A and 4B are flow charts showing the operation of the multimedia distribution system in accordance with the present invention.
Figure 4A:
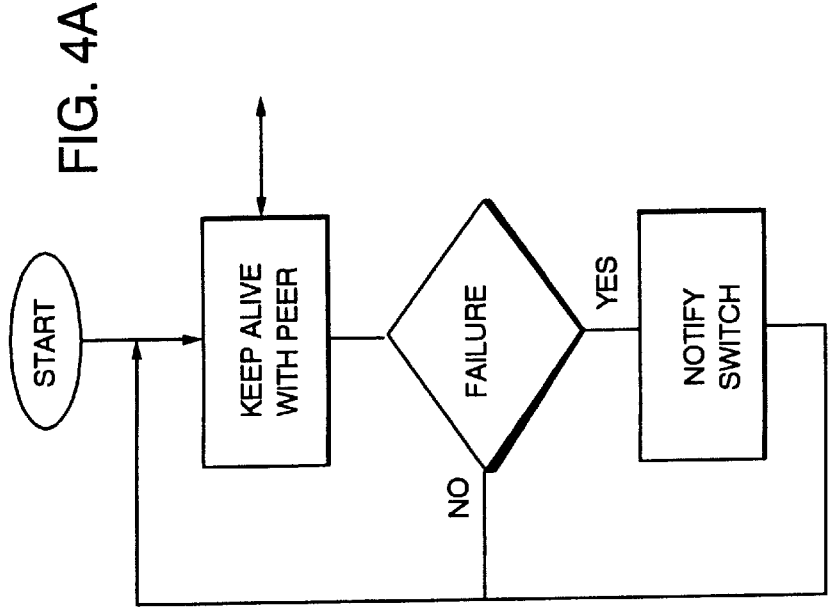

Referring now to FIG. 4A, the fault tolerant mechanism will be described. At the start of an operation, stream controllers 202 and 204, through system control processors 314 maintain a peer to peer communication to indicate that each stream controller is operational. If no failure is detected, the system operates normally. If a failure is detected in either stream controller path, a switchover notify signal is generated and a switchover mechanism, which may be a part of a common operating system controlling system control processors 314 will cause the failing stream controller path (such as 202) to be disconnected from the network 102 and connect the operational peer stream controller (such as 204) to network 102.

Referring now to FIG. 4B, the control of distribution of multimedia data over network 102 will be described.

When a user desires to receive multimedia data from the system 200, a command is sent over network 102 and received by stream controllers 202 and 204, which are in peer to peer communication. A start stagger interval is set by the system control processors 314, for example 5 minutes. Also, the order of precedence as between stream controllers 202 and 204 is set to determine which of the stream controllers 202, 204 will go first. Assuming a START command, the stream controller 202, selected to go first will immediately start to distribute the movie through a communications processor 302 and network 102 to the originating user. The other stream controller 204 will wait the predetermined period (5 minutes) and start a second instance of the same movie. Five minutes later, the first stream controller 202 will start a third instance of the movie, and so on until a STOP command is received.

The result of the staggered start and peer to peer communication between stream controllers 202, 204 is that if one controller fails, the system switches to the same move being distributed on the alternate controller delayed by 5 minutes, so that the user gets to see a 5 minute rerun, and does not lose any data.

Although the present invention and its advantages have been described in detail, it should be understood that various changes, substitutions and alterations can be made herein without departing from the spirit and scope of the invention as defined by the appended claims.

What is claimed is:

1. A multimedia program distribution system for efficiently controlling distribution of program information in real time to a communications network, comprising:

a storage system for storing said program information, said storage system having a plurality of ports for simultaneous access to said program information;

a storage controller for controlling access to said storage system for reading said program information from said storage system;

a plurality of distribution controllers, each of said distribution controllers connected to said storage controller for requesting program information from said storage system and for controlling distribution of said program information to said communications network over a plurality of separate communications paths;

means for controlling staggered distribution of program information from said storage system to said network; and means for switching from a first distribution controller to a second distribution controller when a failure in said first distribution controller is detected.

2. A system according to claim 1, wherein said storage controller distributes program information to the first distribution controller for distribution to said communications network and distributes said program information to the second distribution controller delayed by a predetermined time period.

3. A system according to claim 2, wherein said second distribution controller distributes said program information to said communications network, delayed by the predetermined time period, when a failure in said first distribution controller is detected.

4. A system according to claim 1, wherein each of said distribution controllers controls the simultaneous transmission of a plurality of program information streams to said communications network.

5. A system according to claim 1, wherein said storage system is a redundant array of independent drives.

6. A first distribution controller for requesting multimedia program information from a storage system and for controlling distribution of said program information to a communications network, comprising:

one or more communications processors for controlling distribution of program information to said communications network;

one or more storage control processors for controlling access to one or more storage subsystems;

a system control processor connected to said one or more communications processors, and said one or more storage control processors for controlling operation of said one or more communications processors and said one or more storage control processors for controlling the simultaneous transmission of a plurality of program information streams to said communications network, said system control processor further comprising means for connecting to a second distribution controller for communicating operational status data with said second distribution controller; and the system control processor further comprising means for switching control of one or more program information streams to the second distribution controller on receipt of operational status data indicating a failure in said first distribution controller.

7. A distribution controller according to claim 6, wherein said storage controller distributes program information to the first distribution controller for distribution to said communications network and distributes said program information to the second distribution controller delayed by a predetermined time period.

8. A distribution controller according to claim 7, wherein said second distribution controller distributes said program information to said communications network, delayed by the predetermined time period, when a failure in said first distribution controller is detected.

9. A method for controlling distribution of multimedia program information to a plurality of users from one or more sources of said program information, comprising the steps of:

distributing program information to a first distribution controller for distribution to the plurality of users;

distributing said program information to a second distribution controller after a predetermined time period;

communicating operational status data from the first distribution controller to the second distribution controller;

detecting a failure indicated in received operational status data from said first distribution controller; and switching one or more program distribution paths to the plurality of users from said first distribution controller to said second distribution controller when said failure is detected such that the plurality of users receive said program information delayed by the predetermined time period.

10. A multimedia program distribution system for efficiently controlling distribution of program information in real time to a communications network, comprising:

a storage system for storing said program information, said storage system having a plurality of ports for simultaneous access to said program information;

a storage controller for controlling access to said storage system for reading said program information from said storage system; and a plurality of distribution controllers, each of said distribution controllers connected to said storage controller for requesting program information from said storage system and for controlling distribution of said program information to said communications network;

means for controlling staggered distribution of program information from said storage system to said network; and means for switching from a first distribution controller to a second distribution controller when a failure in said first distribution controller is detected;

each distribution controller further comprising:

one or more communications processors for controlling distribution of program information to said communications network;

one or more storage control processors for controlling access to one or more storage subsystems;

a system control processor connected to said one or more communications processors, and said one or more storage control processors for controlling operation of said one or more communications processors and said one or more storage control processors, for controlling the simultaneous transmission of a plurality of program information streams to said communications network, said system control processor further comprising means for connecting to the second distribution controller for communicating operational status data with said second distribution controller, and means for switching control of one or more program information streams to the second distribution controller on receipt of operational status data indicating a failure in said first distribution controller.

11. A system according to claim 10, wherein said storage controller distributes program information to the first distribution controller for distribution to said communications network and distributes said program information to the second distribution controller delayed by a predetermined time period.

12. A system according to claim 11, wherein said second distribution controller distributes said program information to said communications network, delayed by the predetermined time period, when a failure in said first distribution controller is detected.

13. A system according to claim 10, wherein said storage system is a redundant array of independent drives.

* * * * *